(12) United States Patent
Carr

(10) Patent No.: US 7,603,875 B2
(45) Date of Patent: Oct. 20, 2009

(54) ICE CHEST AIR CONDITIONER

(76) Inventor: Bobby Lee Carr, 220 Piedmont Golf Course Rd., Piedmont, SC (US) 29673

( * ) Notice: Subject to any disclaimer, the term of this patent is extended or adjusted under 35 U.S.C. 154(b) by 258 days.

(21) Appl. No.: 11/494,073

(22) Filed: Jul. 27, 2006

(65) Prior Publication Data
US 2008/0022712 A1 Jan. 31, 2008

(51) Int. Cl.
F25D 3/08 (2006.01)
(52) U.S. Cl. ........................ 62/457.7; 62/425
(58) Field of Classification Search .............. 62/371, 62/457.1, 457.4, 457.7, 425
See application file for complete search history.

(56) References Cited

U.S. PATENT DOCUMENTS

| | | | | |
|---|---|---|---|---|
| 1,972,231 | A | | 9/1934 | Malm et al. ................... 62/288 |
| 2,207,956 | A | | 7/1940 | Timms et al. ................. 62/291 |
| 3,961,496 | A | | 6/1976 | Ku ............................... 62/459 |
| 4,823,554 | A | * | 4/1989 | Trachtenberg et al. ......... 62/3.3 |
| 4,841,742 | A | | 6/1989 | Biby ............................ 62/420 |
| 5,024,065 | A | | 6/1991 | Barrett ......................... 62/285 |
| 5,062,281 | A | | 11/1991 | Oliphant et al. ............... 62/457 |
| 5,159,819 | A | | 11/1992 | Wong ........................... 62/419 |
| 5,197,301 | A | | 3/1993 | Holcomb ...................... 62/457 |
| 5,483,799 | A | * | 1/1996 | Dalto ........................... 62/3.7 |
| 5,685,165 | A | | 11/1997 | Bigelow, Jr. ................. 62/420 |
| 6,170,282 | B1 | | 1/2001 | Eddins ....................... 62/259.3 |
| 6,237,698 | B1 | * | 5/2001 | Carrier et al. ................... 173/2 |
| 6,354,104 | B1 | * | 3/2002 | Feagin ....................... 62/457.1 |
| 6,401,482 | B1 | | 6/2002 | Lee et al. ....................... 62/420 |
| 6,568,202 | B1 | | 5/2003 | Hodges ........................ 62/306 |
| 6,571,568 | B1 | * | 6/2003 | Link ............................. 62/244 |
| 6,571,574 | B1 | | 6/2003 | Blackstone ................... 62/420 |
| 6,819,085 | B2 | * | 11/2004 | Kimoto ....................... 320/150 |
| 6,901,769 | B2 | | 6/2005 | Blackstone ................... 62/420 |
| 6,971,249 | B1 | | 12/2005 | Blackstone ................... 62/421 |
| 6,993,930 | B2 | | 2/2006 | Blackstone ................... 62/421 |
| 7,263,855 | B2 | * | 9/2007 | Meyer et al. .................. 62/371 |
| 2004/0074250 | A1 | | 4/2004 | Junkins ....................... 62/259.3 |
| 2005/0016199 | A1 | | 1/2005 | Blackstone ................... 62/420 |
| 2005/0268622 | A1 | | 12/2005 | Krieger ........................ 62/3.6 |

OTHER PUBLICATIONS

Roshgo Corporation Website; www.roshgo.com; KoolerAire Portable Air Conditioner; Jul. 12, 2006.
Swampy Website; www.swampy.net; 12-volt Portable Air Conditioning; Mar. 26, 2006.

* cited by examiner

Primary Examiner—Melvin Jones
(74) Attorney, Agent, or Firm—Timothy J. Monahan; Monahan + Moses, LLC

(57) ABSTRACT

A battery-powered, portable air conditioner apparatus is provided having an insulated chest with two holes in the lid. A fan is positioned in one of the holes for drawing air into the chest, where heat is exchanged with the contents of the chest, and the other hole is a vent, through which the conditioned air exits. The air conditioner apparatus may be provided with a receptacle that is capable of engaging rechargeable, cordless power tool battery packs.

20 Claims, 5 Drawing Sheets

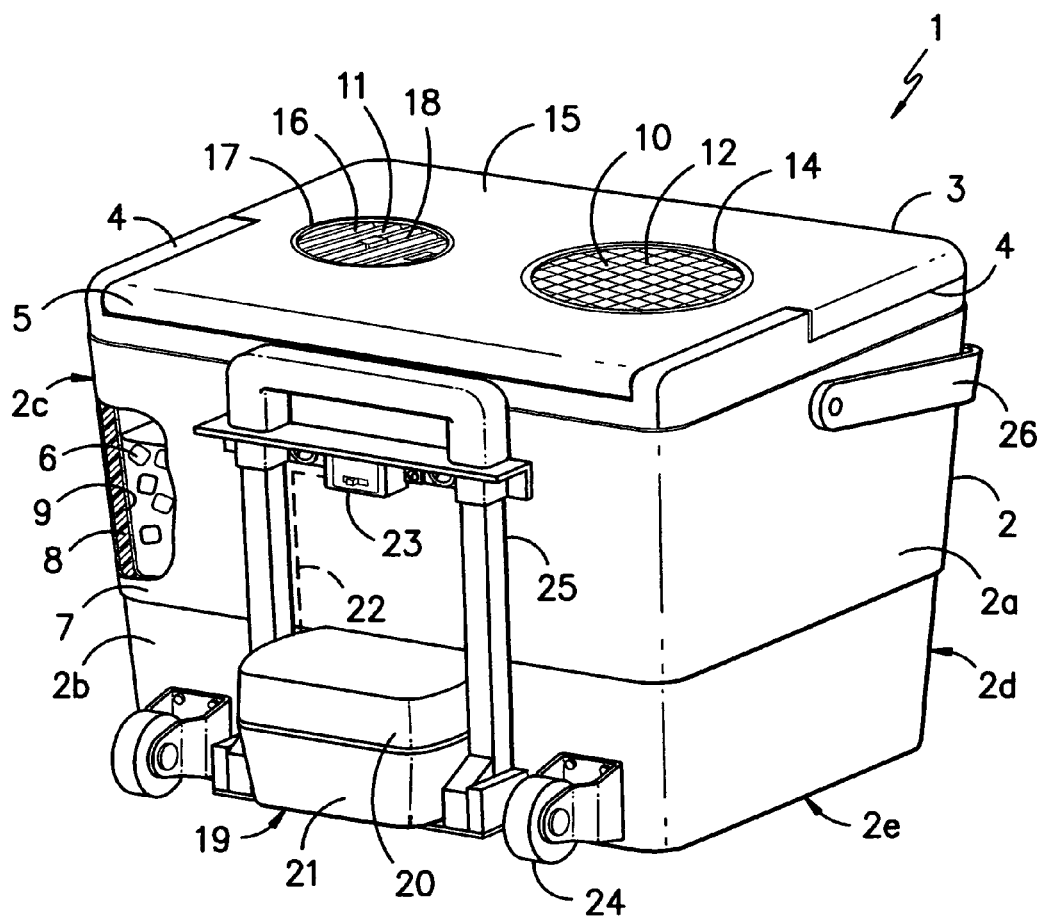
FIG. −1−

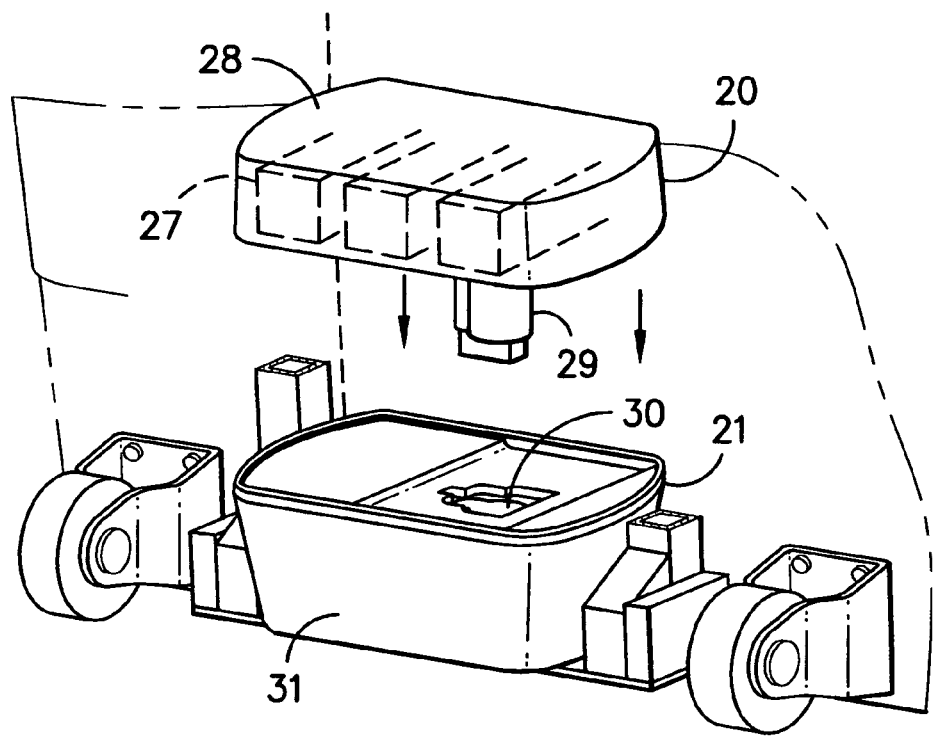
FIG. -2-
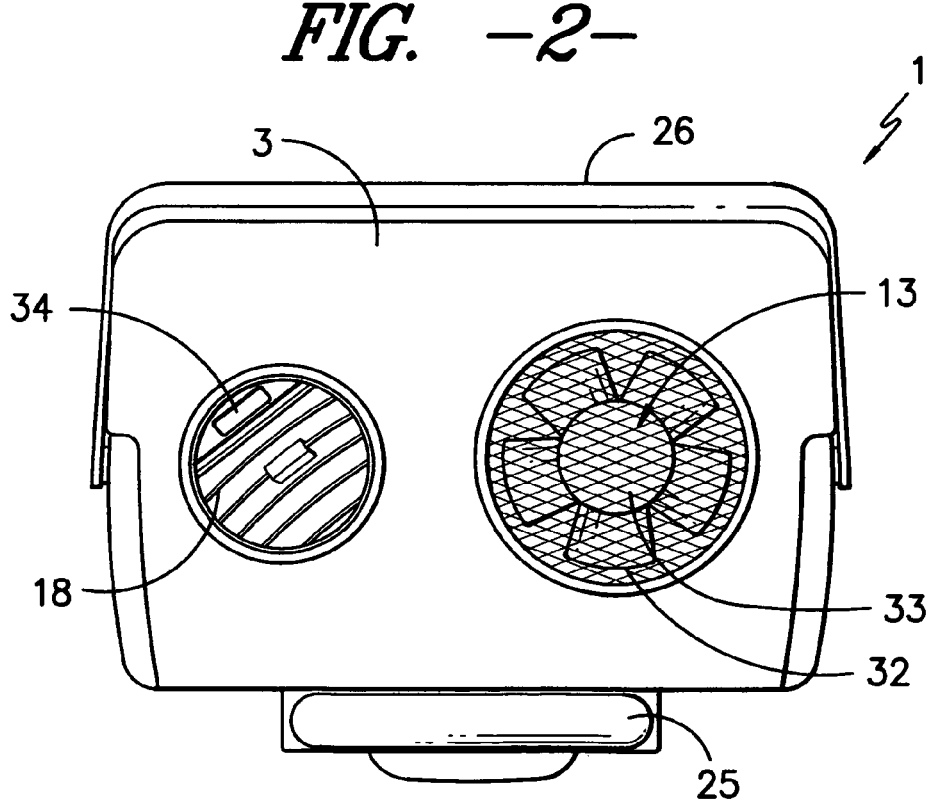
FIG. -3-

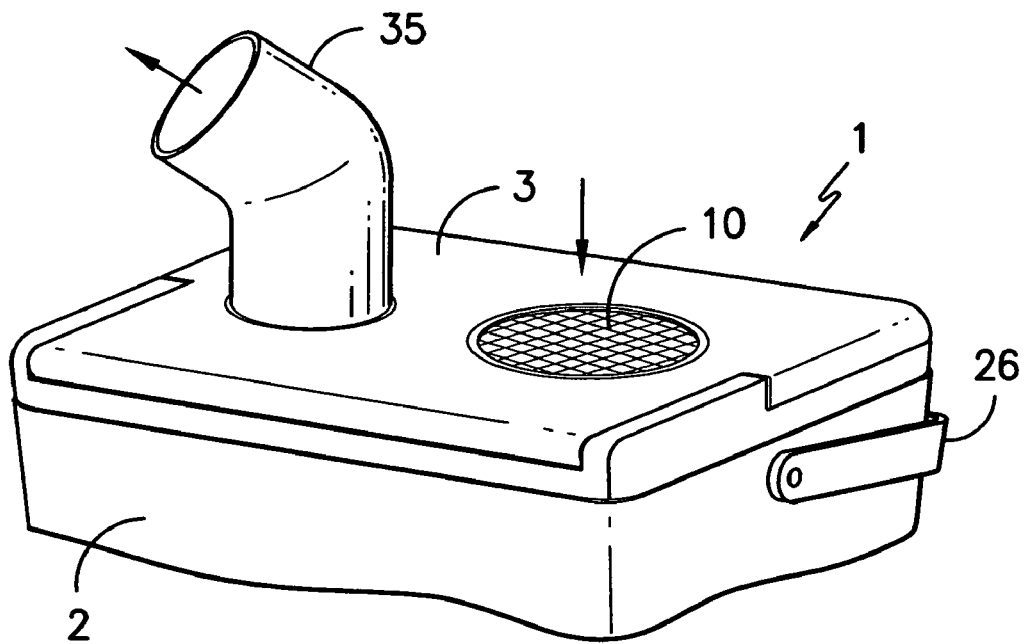
FIG. -4-
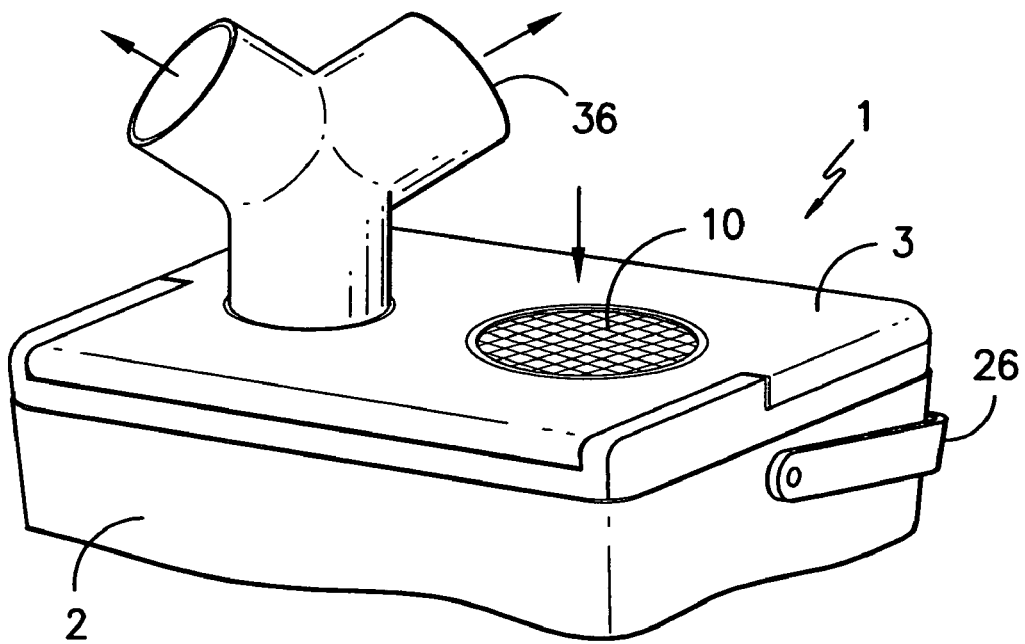
FIG. -5-

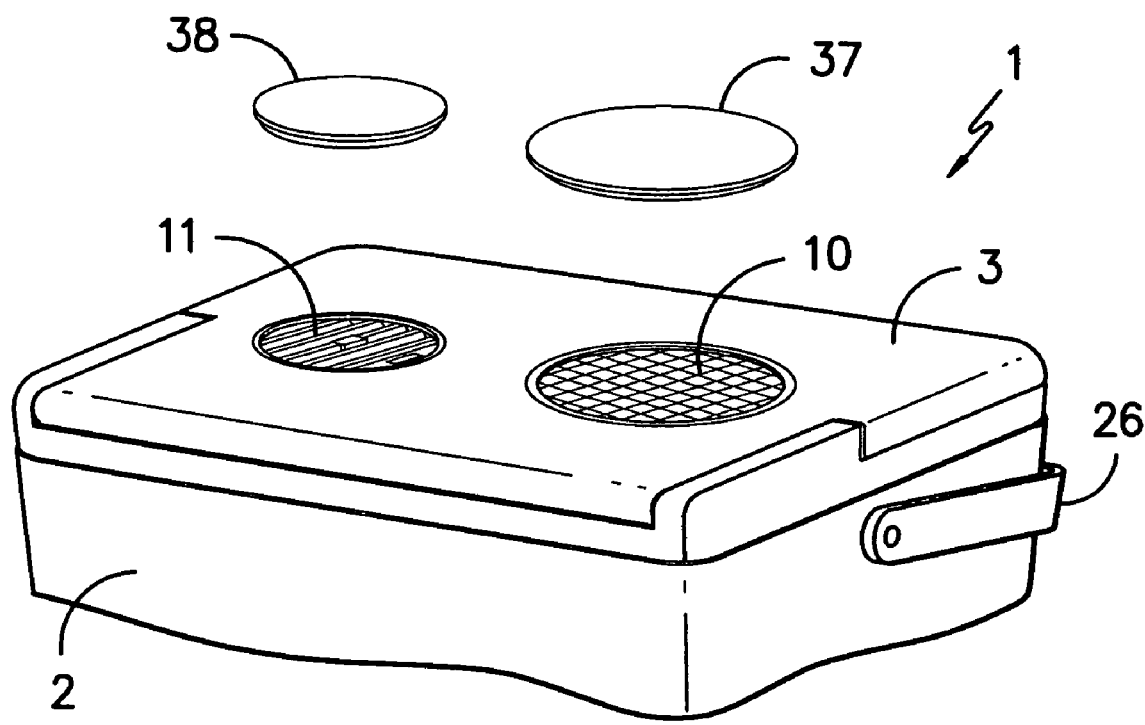
FIG. -6-

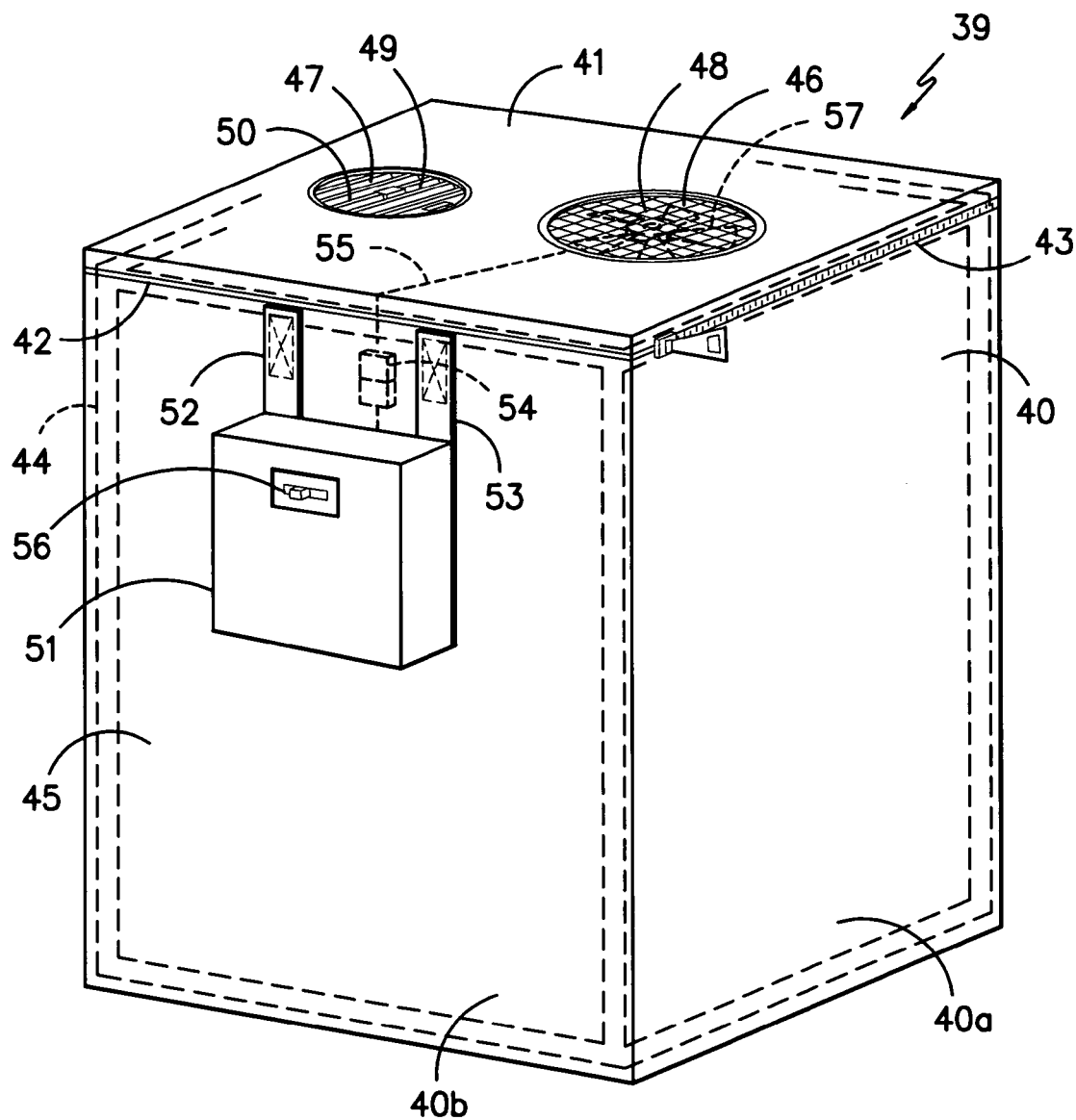
FIG. —7—

ICE CHEST AIR CONDITIONER

BACKGROUND OF THE INVENTION

The present invention relates generally to a portable air conditioning device, and in particular to a device having a battery powered fan, mounted in the lid of the ice chest, which forces a stream of air into the ice chest, across the contents and through a vent in the lid. The invention also includes means to mount a rechargeable battery pack, for powering the fan, on the outside of the ice chest.

Various combinations of a fan and a reservoir of ice and/or cold water have been used to generate a stream of cool air. In U.S. Pat. Nos. 1,972,231 and 2,207,956, an electric fan blows air upward past a reservoir containing cold water, to cool a room.

Ice-cooled air conditioners are shown in U.S. Pat. Nos. 4,841,742 and 5,197,301. A fan or blower forces air through ducts, which are in contact with a reservoir of ice. The air conditioning units are designed to be portable.

U.S. Pat. No. 5,062,281 discloses an air conditioning device designed to be used with a cup of ice water (or hot water). A lid containing a blower assembly, namely a fan, batteries and air exit vent, is fitted over the top of the cup. The fan forces air into the cup and out through the exit vent. A palm-sized air conditioning device is shown in U.S. Pat. No. 5,159,819. A battery powered fan blows air past cubes of ice, to generate a cool air stream. The units are capable of handling only a small volume of air.

A portable air conditioning system comprising a fan, a radiator and an ice chest containing chilled water is disclosed in U.S. Pat. No. 5,685,165. A pump submerged in the ice chest circulates the chilled water through the radiator. Air is drawn through the radiator by a fan to create a cool air stream.

U.S. Pat. Nos. 6,401,483 B1 and 6,571,568 B1 disclose inserts containing a fan and a vent, which are supported on a ledge inside of an ice chest. The fan or blower forces air into the ice chest containing chilled water (or hot water) and out the vent. The inserts are provided with an adapter, which can be connected to a vehicle's cigarette lighter, for 12 volt DC power. When such inserts are used in the ice chest with a hinged lid, the lid must be propped open, which increases the amount of space required to operate the device. Alternatively, if the lid of the ice chest is detached when the device is in operation, the lid must be stored out of the way.

The prior art systems suffer from one or more of the following shortcomings: complex construction, such as the incorporation of ductwork and passageways through the cooling (or heating) medium, or the use of a pump to circulate the cooling medium through a radiator. Many of the devices lack portability. The air conditioning apparatus providing an "insert" for an existing ice chest, necessarily involve an extra component, and are typically restricted in compatibility to a particular size and brand of ice chest. Further, inserts that fit on a shelf inside the ice chest, reduce the working space within the ice chest.

SUMMARY OF THE INVENTION

The object of the present invention is to overcome the aforementioned shortcomings in the prior art, by providing a portable, easy-to-manufacture, compact and self-contained air conditioning device.

The following description of the invention references "ice chests" and "coolers." It may be understood, however, that instead of filling the compartment of the ice chests/cooler with ice, cold water or other cold objects, to serve as the means to chill the air, the compartment may alternatively be filled with hot water or other hot objects, to serve as a means to heat the air.

The air conditioning device comprises an insulated ice chest or cooler, referred to generally as a chest. The chest has a body, which forms a compartment having an opening at one end, and a lid, covering the opening. The body is defined by sides and a bottom. The opening of the body is defined by a rim, opposite the bottom, and forming the upper edge of the body. The body and the lid form the outer walls of the chest.

Typically, the chest is cuboid shaped, also called a right rectangular prism. Also within the scope of the invention is a cylindrical chest, wherein the body is defined by a curved "side" and a flat bottom. The side wall of a cylindrical chest is intended to be encompassed within the term "sides."

The lid engages the body of the chest, so that the lid is held in place covering the opening when the ice chest air conditioner is in use or being transported, and so that the chest may be easily opened to access the contents. In one embodiment, when the lid and the body are engaged, the lid at least partially overlays the rim of the opening of the body and is supported thereby. Thus, the lid may overlay a part of the perimeter, or the total perimeter of the rim of the opening. In an embodiment of the invention where the lid does not overlay the total perimeter of the rim, it is nevertheless desirable that the rim of the body does not protrude above the upper surface of the lid, so, for example, the lid may be comfortably used as a seat.

In one embodiment of the invention, one edge of the lid is attached to the body of the chest by a hinge. Thus, the lid may be swung open to access the contents of the compartment. Various methods of constructing an ice chest with a hinged lid are known to those skilled in the art. Typically, the lid overlays and is supported by the rim of the body, opposite the hinge, when the lid is closed.

In an alternative embodiment, the lid is not hinged, but rather is removable. For example, the lid can be proportioned to engage the open end of the body of the chest. Typically, a removable lid will overlay the total perimeter of the rim, when engaged with the body of the chest. Additionally, the lower side of the lid may be provided with a flange, which engages the inside surface of the body of the chest, adjacent the opening.

The chest may be rigid. For example, the chest may be constructed out of a suitable polymer, such as a thermoplastic or thermosetting resin, or constructed out of metal, such as steel or aluminum, or any combinations of such materials.

In one embodiment of the invention, the lid is constructed from materials sufficiently sturdy to serve as a seat. The upper surface of the lid is substantially planar and horizontal when the lid is closed. By way of example, it is desirable the lid is capable of supporting a weight of at least 150 lbs, distributed over its surface.

Alternatively, the body of the chest may be a "soft cooler" constructed out of an insulated, flexible material, with a waterproof liner, and provided with a rigid or semi-rigid lid, that is, the lid is capable of holding its shape during operation of the invention. Typically, the lid of a soft cooler is hinged and is engaged with the body by a zipper. The "hinge" may be created by folding a continuous piece of the flexible material comprising the lid and side of the body. Preferably, the soft cooler is provided with a frame or other reinforcement, capable of maintaining the body in a free-standing position, with the lid supported a sufficient distance above the contents of the compartment, to allow air to circulate and to prevent the fan from being submerged.

In one embodiment of the invention, the walls of the chest, including both the body and the lid, are comprised of an exterior shell, an interior shell and a layer of insulating material sandwiched between the exterior and interior shells, as is known in the art.

By way of example, the present invention is particularly advantageous when employed with chests having a volume capacity of from 8 to 64 quarts, preferably from 12 to 24 quarts.

Preferably, the lid is substantially planar in shape, having a length, width and thickness. Two openings or holes are provided through the thickness of the lid. The openings in the lid are positioned to circulate air through the compartment of the chest and to optimize heat transfer between the air and the contents of the chest.

A fan is positioned in one of the openings. The term "fan" is intended to encompass an electric motor attached to blades or vanes, which are aligned to move air when rotated. The fan is pointed to direct a stream of air downward, into the compartment of the chest. In one embodiment of the invention, the fan is an axial flow, propeller fan. Preferably, the fan is powered by a direct current (DC) motor. The fan may have multiple speeds, for example high and low speeds, which can be controlled by a suitable switch.

By way of example, the dimensions of the opening in the lid for the fan may range from 2 to 8 inches in diameter.

The lid may be provided with a protective grate, positioned over the intake of the fan, that is, on the outer surface of the lid. The grate protects the fan and prevents injury.

The other opening in the lid serves as the vent, through which the air drawn in by the fan exits the chest. An uncovered opening may serve as the vent. Preferably, the vent has means to direct the exiting air. For example, the vent may include one or more sets of vanes that can be tilted to direct the air, such as may be found in automobile ventilation systems. The set of vanes may be designed to be manually repositioned in the opening, for example by rotating the set of vanes, to direct the air in any direction. The vents may be closed, for example, when the air conditioner is not in use, to maintain the temperature of the contents.

In another embodiment of the invention, the vent may include a small duct or conduit, which may be allowed to pivot, to direct the air. A "Y" shaped duct may be used, for example, to direct cool air to two individuals at once. It is also within the scope of the invention to provide a removable duct, which engages the opening in the lid, but can be removed when the device is being transported.

The fan and vent may be positioned in the openings in the lid to achieve a substantially flat profile, relative to the outer surface of the lid. The grate for the fan can be made sufficiently strong to support weight, for example, when the fan is not in operation and the lid is used as a seat. Similarly, the vent design and materials of construction may be selected for sufficient strength to support weight. Further, the flat profile prevents damage to the fan and vent during transportation and storage of the device.

By way of example, the dimensions of the opening in the lid for the vent may range from 1½ to 8 inches in diameter.

Surprising, there is little heat transfer through the openings in the lid, when the fan is not in operation. For example, the chest may be filled with ice in the morning and transported for use at a sporting event later in the day, with only a minor loss of ice, relative to a chest without openings in the lid. Nevertheless, the opening in the lid for the fan, or the opening in the lid for the vent, or both, may be provided with a removable cover that engages the lid and blocks the flow of air through the opening, when the air conditioner is not in use. In one embodiment, each lid is substantially the same size as the opening that it covers. If a cover is employed, the materials of construction and design may be selected so that the cover has one or more of the following features:

when engaged with the lid, the cover is substantially flush with the top (outer surface) of the lid;

when engaged with the lid, the cover may be used as a seat;

the cover has sufficient strength to support a weight of 100 lbs. spread over its surface, without breaking or deflecting more than 1 inch;

the cover rests on (i) a grate covering the fan; or (ii) the vanes comprising the vent; and/or the cover is retractable, within the lid, when not in use.

The present invention, having a lid with holes for a stream of air to circulate in and out of the chest, is distinguishable from prior-art, ice chest air conditioners in which an insert is placed inside of an ice chest and the lid of the ice chest is opened or removed during operation.

The portable air conditioning device is provided with a power unit, comprising a battery pack, electrically connected to the fan, and a switch, for controlling the flow of current to the fan. In a preferred embodiment, the power unit also comprises means to attach the battery pack to the outside of the chest. By way of example, the battery pack attaching means may be a pocket or holder affixed to the outside of the chest. In another example, the battery pack attaching means may be a recess in the outer surface of the chest, proportioned to engage the battery pack.

By way of further example, the battery pack attaching means may be a receptacle affixed to an outer wall of the chest, wherein the receptacle is configured to physically engage the battery back, such as by interlocking parts or clamps. In addition to providing a means to attach the battery pack to the chest, the receptacle may also provide the electrical connection between the battery pack and the fan. For example, the receptacle may be electrically connected to battery pack by a suitable electrical adapter, and the receptacle may be electrically connected to the fan by a wire.

A switch is located on the electrical circuit between the battery pack and the fan, to allow the fan to be turned on and off, as desired. It may be understood that the switch may control the flow of current to provide multi-speed operation of the fan, in addition to turning the fan on and off.

Optionally, the wire carrying electrical current from the battery pack to the fan may be run, at least for some distance, between the exterior shell and the interior shell of the chest, both for aesthetics and to avoid snagging the wire. With such a configuration it is desirable to attach the lid to the body of the chest with a hinge, thereby avoiding having to disconnect the wire when the lid is removed. Further, the wire may be run up through the wall of the chest, the hinge, and the lid, where it is connected to the fan, in such a way that the wire is not visible.

A wire run through the exterior and interior shells of a wall of the chest may run from the above described receptacle. Alternatively, the battery pack may have a plug that is inserted into an electrical outlet, which is built into a wall of the chest.

The chest may be provided with a recess to accommodate the power unit. In one embodiment, the recess is sufficiently deep so that the power unit is substantially flush with the side of the chest, to which it is attached.

In one embodiment of the invention, the battery pack is attached to the outside of the chest in such a way that the battery pack may be readily disengaged from the chest, for example, to place the battery pack on a charger and/or to replace a discharged battery pack with a freshly charged one. Thus, the means to attach the battery pack to the chest may be temporary, that is, the battery pack may be disengaged at will.

The battery pack is preferably rechargeable, and is comprised of one or more rechargeable batteries. By way of example, suitable batteries include nickel cadmium, nickel metal hydride and lithium ion batteries. The battery pack can be easily removed from the receptacle and replaced with a charged battery pack, as necessary. The specification of the battery pack will vary depending upon the power requirements of the fan, and desired length of operation, before the battery pack is switched. Satisfactory results may be achieved with battery packs ranging in electrical potential of from 6 to 24 volts, preferably 9 to 18 volts, and having sufficient amperage capacity to operate the fan for at least one hour, preferably at least 3 hours.

Examples of battery packs that may be employed in the present invention are the battery packs used in cordless power tools. For example, cordless drills, screwdrivers, saws, shears, wrenches, hand vacuums and hammers are commonly used in commercial construction and by homeowners. Cordless power tools are manufactured and sold under the following trademarks or trade names: DeWalt, Makita, Milwaukee, Bosch, Black & Decker, Skil and Craftsman. Such battery packs are referred to generally herein as "cordless power tool battery packs."

Generally, the cordless power tool battery packs of one manufacturer are not interchangeable with those of another. Each manufacturer has developed a unique physical configuration for the interlocking components of the battery pack (typically the "male" component) and the tool (typically the "female" component), with which the battery pack is engaged. For example, a DeWalt brand battery pack will not fit a Makita power tool.

In one embodiment of the invention, the receptacle is designed to engage a battery pack used for a particular brand of cordless power tools. It is also within the scope of the invention to offer the air conditioning device with a receptacle that is compatible with the model or brand of cordless power tool battery pack of the purchaser's choice. Thus, a model of the present invention can be offered with a receptacle to fit any commercial brand of cordless power tool battery pack.

In another embodiment of the invention, the receptacle is comprised of two components, namely (i) a removable adapter, and (ii) a base attached to the chest. The adapter is selected to accommodate a particular model or brand of cordless power tool battery pack, and functions to make the electrical connection with the battery pack and to secure the battery pack in place. The base engages the adapter, so that the adapter and battery pack are securely attached to the chest. The receptacle also is provided with means to electrically connect the adapter and the fan. Suitable connection means comprise an electrical connection between the adapter and the base, for example a plug and socket, and an electrical connection between the base and the fan. In an alternate embodiment, the adapter may be electrically connected directly to the fan, for example by a wire, and the base functions only to physically secure the adapter to the chest.

Accordingly, it may be understood that the air conditioning device can be sold with only the base of the receptacle mounted on the chest. The purchaser could select an adapter that is compatible with the model/brand of cordless power tool battery pack of choice, and engage the adapter with the base, thereby completing the receptacle. The battery pack may be disengaged from a power tool and engaged with the receptacle, when one is ready to use the air conditioner.

BRIEF DESCRIPTION OF THE DRAWINGS

FIG. 1 is a 3-dimensional view of the ice chest air conditioner, with a cutaway view showing the inside of the chest.

FIG. 2 is an exploded view of the power unit, comprising the battery pack and receptacle.

FIG. 3 is a top view of the ice chest air conditioner.

FIG. 4 is a 3-dimensional view of the ice chest air conditioner, with an elbow duct for directing the exhaust air.

FIG. 5 is a 3-dimensional view of the ice chest air conditioner, with a "Y" shaped duct for directing the exhaust air in two directions.

FIG. 6 is a 3-dimensional view of the ice chest air conditioner showing the removable cover for the fan intake and the exhaust vent.

FIG. 7 is a 3-dimensional view of the ice chest air conditioner having a flexible body, with phantom lines showing an internal support structure.

DETAILED DESCRIPTION OF THE INVENTION

Without limiting the scope of the invention, a detailed description of the invention and the drawings is hereinafter set forth. All of the United States patents, which are cited in the specification, are hereby incorporated by reference.

FIG. 1 is a 3-dimensional view of the back side and lid of the chest. Chest 1 is comprised of body 2 and lid 3, and has a cuboid shape. Body 2 has sides 2a-2d and bottom 2e. Body 2 has rim 4 at its upper edge. Lid 3 is attached to body 2 at rim 4 by hinges 5, which allow lid 3 to swing up, for access to the contests of the chest. Lid 3 rests on and is supported by rim 4 along the side of lid 3 opposite hinges 5, as well as the portion of rim 4 between hinges 5, when the lid is closed.

A portion of chest 1 is cut away to show ice 6 packed into the interior of the chest. The sides of body 2 are made up of an exterior shell 7, insulation 8 and interior shell 9. The exterior and interior shell may be constructed out of metal, for example, stainless steel or aluminum, or from a thermoplastic or thermosetting polymer, or combinations of the foregoing materials. Suitable insulating materials include fiberglass and thermoplastic and thermosetting fibers and foams, for example polyurethane, polyisocyanurate and polystyrene foam materials.

Lid 3 has opening 10 for air intake and opening 11 for air exhaust. Grate 12 covers intake opening 10, where fan 13 (shown in FIG. 3) is located. Grate 12 is held in place by retaining ring 14. While grate 12 is slightly recessed relative to the upper surface 15, it may nevertheless provide a comfortable surface on which to sit. Grate 12 is designed to allow a maximum amount of air to pass, while still maintaining sufficient strength to support a person sitting on lid 3. The openings in grate 12 should be small enough to prevent a child's finger from contacting the blades of the fan 13. Examples of suitable grates include: heavy gauge wire mesh, grills made from metal plates with multiple apertures, and molded plastic grills.

Exhaust opening 11 has vent 16 positioned therein and held in place by retaining ring 17. Vent 16 is made up of vanes 18, which can pivot to direct the flow of air exiting exhaust opening 11. Additionally, vent 16 rotates 360° in a plane parallel to lid 3, so that air may be diverted in any direction.

Fan 13 is powered by power unit 19, comprised of a battery pack 20, engaged with receptacle 21, which is attached to the back side 2b of body 2. Wire 22 is threaded through side 2b between the exterior shell 7 and interior shell 9, and is partially shown in the cut away of body 2. Wire 22 is connected to switch 23 mounted on side 2b in a conveniently accessible location. Wire 22 continues from switch 23, through side 2b, sideways into lid 3 at hinge 5, where it is threaded between the exterior shell and interior shell of the lid, and connected to fan 13.

For convenience, chest 1 is provided with wheels 24 and an extendable, telescoping handle 25, such as may be found on luggage. Additionally, chest 1 has lifting handle 26, which swings out of the way to the front side 2d of chest 1, when not in use.

Referring to FIG. 2, an exploded view of power unit 19 is shown. Battery pack 20 is the type used with cordless power tools. A plurality of batteries 27 are arranged in the compartment 28 of battery pack 20. A male connector 29 extends downward from battery pack 20. The male connector 20 provides a secure electrical connection with the receptacle 21 and will not separate when the chest is transported and jostled about.

Receptacle 21 has a female connector 30 corresponding to the shape of male connector 29 and provides both a means to hold battery pack 20 securely in place, as well as provide an electrical connection to male connector 29. In the embodiment shown in FIG. 2, power unit 19 has band 31, which is attached to side 2b of chest 1 and provides a means to secure receptacle 21 to the chest, along with the battery pack.

It is within the scope of the present invention to provide a variety of adapters for use in the power unit. For example, in may be understood that each brand of battery pack may have a different means to connect to a device that is to be supplied with power. Especially with regard to cordless power tool battery packs, brand loyalty is often encouraged by providing the battery packs and cordless power tools with unique male and female connectors, respectively, that are compatible with each other, but not with other brands of tools.

Therefore, the present invention may also be characterized as providing a plurality of adapters for use with the ice chest air conditioner. For example, one style of adapter has a first side, configured to engage and make an electrical connection with a particular brand of cordless power tool battery pack and a second side configured to engage and make an electrical connection with a base component of the receptacle. A second style of adapter is to be provided, which is similar to the first style of adapter, with the only difference being that the first side is configured to engage and make electrical connection with a different brand of cordless power tool battery pack. The side of the adapter that engages the base of the receptacle can be the same or standard for all of the plurality of adapters.

In the description of the invention, the battery pack 20 is provided with a male connector 29 and the receptacle 21 is provided with a female connector 30. It may be understood that the male/female configuration may be reversed, or other means may be used to engage the battery pack and the receptacle, whereby the battery pack is held securely in place and an electrical connection between the battery pack and the receptacle is completed.

FIG. 3 shows a top view of the ice chest air conditioner. Fan 13 has blades 32 and motor 33, configured to direct air from outside of the chest, downward into the interior of the chest. Wire 22 provides DC current to motor 33. Exhaust vent 16 has lever 34, to position or close vanes 18, thereby directing the air being forced from the interior of the chest, as desired.

FIG. 4 shows an embodiment of the invention having elbow duct 35 for directing the air being exhausted from the interior of the chest. Duct 35 provides a more focused stream of air. Duct 35 can be rotated 360° and is removable for transportation and storage, for example, by placing duct 35 inside of chest 1.

FIG. 5 shows an embodiment of the invention having "Y" shaped duct 36 for directing a focused stream of air in two directions at once. Duct 36 can be rotated 360° and is removable. The "Y" shaped duct 36 is particularly useful for placement in golf carts, on the floorboard, between two riders.

FIG. 6 is an exploded view of cover plates 37 and 38, which may be placed over the fan intake opening 10 and the vent exhaust opening 11, respectively, when the ice chest air conditioner is not in use.

Referring to FIG. 7, an embodiment of the invention is shown, wherein chest 39 has flexible body 40. Sides 40a and 40b of body 40 are visible in the drawing. Lid 41 may be integral with side 40b, and folded over to form hinge 42. Zipper 43 is provided around the perimeter of lid 41 (except for hinge 42), for closing chest 39, as desired.

Chest 39 is provided with an internal frame 44, shown in phantom lines, for maintaining its shape and preventing lid 41 from contacting the contents of chest 39. Frame 44 may be inserted between the exterior shell 45 and interior shell (not shown) of body 40, or may be positioned in the interior of body 40.

Lid 41 has intake opening 46 and exhaust opening 47. Intake opening 46 is covered by grate 48, and a fan (not shown) is positioned in intake opening 46 to direct air downward. Exhaust opening 47 has vent 49, with vanes 50, to direct the air being forced out of chest 39.

Power unit 51 is attached to chest 39 by straps 52 and 53, which are affixed to frame 44, through small slits in side 40b, near hinge 42. Power unit 51 is electrically connected to the fan by plug 54 and wire 55. Switch 56 controls the flow of current to fan 57.

The invention may be further understood by reference to the following claims.

What I claim is:

1. A portable air conditioning device, comprising
  (a) an insulated chest having (i) a body, defined by sides and a bottom and having an opening at one end defined by a rim forming the upper edge of the body; and (ii) a lid, covering the opening in the body, wherein the lid at least partially overlays the rim and is supported thereby, the lid having first and second holes through its thickness;
  (b) a fan, positioned in the first hole in the lid to direct a stream of air downward into the chest;
  (c) a vent, positioned in the second hole in the lid, to allow the stream of air to pass from inside the chest to outside the chest; and
  (d) a power unit, attached to the outside of the chest, having (i) a replaceable, rechargeable battery pack, containing one or more batteries, electrically connected to the fan; and (ii) a switch, located on an electrical circuit between the battery pack and the fan, for turning the fan on and off.

2. The device of claim 1 wherein the lid is attached to the body by a hinge.

3. The device of claim 2 wherein the power unit is attached to a side of the body of the chest.

4. The device of claim 3, wherein the side of the chest has an exterior shell, an insulation layer and an interior shell, and wherein the battery pack is electrically connected to the fan by a wire positioned between the exterior and interior shells of the side of the chest.

5. The device of claim 1, wherein the lid is comprises an exterior shell, an interior shell and a layer of insulation between the exterior and interior shells, and the lid is substantially planar in shape and is horizontal when closed.

6. The device of claim 1, wherein the power unit further comprises a receptacle, attached to the outside of the chest and electrically connected to the fan, wherein the receptacle engages the battery pack and (i) provides an electrical connection between the battery pack and the fan; and (ii) temporarily attaches the battery pack to the chest.

7. The device of claim 1, further comprising a cover plate, substantially the size of the first hole in the lid, and overlaying the first hole.

8. A portable air conditioning device, comprising
(e) an insulated chest having (i) a body, with an opening at one end, defined by a rim forming the upper edge of the body; and (ii) a lid covering the opening in the body and attached to the body by a hinge, whereby the lid is at least partially supported by and overlaying the rim, the lid having first and second holes through its thickness, and wherein the lid, when closed, forms a substantially planar, horizontal surface;
(f) a fan, positioned in the first hole in the lid to direct a stream of air downward into the chest;
(g) a vent, positioned in the second hole in the lid, to allow the stream of air to pass from inside the chest to outside the chest; and
(h) a power unit, having (i) a receptacle attached to the outside of the chest and electrically connected to the fan; (ii) a removable, rechargeable battery pack, containing one or more batteries, engaged with, supported by and electrically connected to the receptacle; and (iii) a switch, located on an electrical circuit between the receptacle and the fan, for turning the fan on and off.

9. The device of claim 8, wherein the receptacle is comprised of (i) a removable adapter configured to engage and make an electrical connection with the battery pack; and (ii) a base attached to the chest and configured to engage and hold the adapter; and (iii) means to electrically connect the adapter to the fan; and wherein the battery pack is a cordless power tool battery pack.

10. The device of claim 8, wherein the lid is capable of supporting at least 150 lbs.

11. The device of claim 8, wherein the chest has a volume of 12 to 24 quarts.

12. The device of claim 8, further comprising a cover plate, substantially the size of the first hole in the lid, and overlaying the first hole.

13. The device of claim 8, wherein the battery pack is a rechargeable, cordless power tool battery pack.

14. A portable air conditioning device, comprising
(i) a flexible, insulated chest having (i) a body, defined by sides and a bottom and having an opening at one end defined by a rim forming the upper edge of the body; and (ii) a lid covering the opening in the body and attached to the body by a hinge, wherein the lid engages the rim of the body by a zipper and is supported thereby, the lid having first and second holes through its thickness;
(j) a fan, positioned in the first hole in the lid to direct a stream of air downward into the chest;
(k) a vent, positioned in the second hole in the lid, to allow the stream of air to pass from inside the chest to outside the chest; and
(l) a power unit, attached to the outside of the chest, having (i) a replaceable, rechargeable battery pack, containing one or more batteries, electrically connected to the fan; and (ii) a switch, located on an electrical circuit between the battery pack and the fan, for turning the fan on and off.

15. The device of claim 14, wherein the hinge is created by folding a continuous piece of flexible, insulated material comprising the lid and side of the body.

16. The device of claim 14, wherein the chest has a volume of 12 to 24 quarts.

17. The device of claim 14, wherein the battery pack is a rechargeable, cordless power tool battery pack.

18. The device of claim 14, wherein the power unit further comprises a receptacle, attached to the outside of the chest and electrically connected to the fan, wherein the receptacle engages the battery pack and (i) provides an electrical connection between the battery pack and the fan; and (ii) temporarily attaches the battery pack to the chest.

19. The device of claim 18, wherein the receptacle is comprised of (i) a removable adapter configured to engage and make an electrical connection with the battery pack; and (ii) a base attached to the chest and configured to engage and hold the adapter; and (iii) means to electrically connect the adapter to the fan; and wherein the battery pack is a cordless power tool battery pack.

20. The device of claim 19, wherein the power unit is attached to a side of the body of the chest.

* * * * *